UNITED STATES PATENT OFFICE.

LOUIS WOLTERSDORF AND GEORGE S. ANGUS, OF CHICAGO, ILLINOIS.

COMPOSITION OF MATTER FOR BUILDING PURPOSES.

SPECIFICATION forming part of Letters Patent No. 566,833, dated September 1, 1896.

Application filed April 3, 1896. Serial No. 586,061. (No specimens.)

*To all whom it may concern:*

Be it known that we, LOUIS WOLTERSDORF and GEORGE S. ANGUS, citizens of the United States, residing at Chicago, in the county of Cook and State of Illinois, have invented a certain new and useful Improvement in Composition of Matter for Building and Fireproofing Purposes, of which the following is a full, clear, concise, and exact description.

Our invention relates to a composition of matter peculiarly adapted for building and fireproofing purposes in the manufacture of tiles and blocks for walls, partitions, ceilings, and the like. In its preferred form the composition of matter comprises calcined gypsum, finely-divided particles of woody matter containing tannin, vegetable fiber, preferably crude flax in the shredded state in which it is delivered from the threshing-machine, finely-divided cinders or ashes, and sulfate of iron, to which may be added pearlash and glue, though the latter elements may be omitted, these ingredients being combined and mixed in the proportions and manner hereinafter described according to the particular use to which the tiles are to be subjected.

The mixture is made in the presence of water, and a strong light concrete of fireproofing material is formed, which may be molded into boards, tiles, slabs, or blocks of any desired size and shape, and which may be solid or hollow, as desired.

We have employed the materials in the following proportions, which, however, may be varied within limits without departing from the spirit of our invention: calcined gypsum, one hundred parts, by weight; bark or wood containing tannin, twenty-five parts; ashes or cinders, fifty parts; sulfate of iron, one one-hundredth part; pearlash, five one-hundredth parts; glue, one one-thousandth part; flax-straw or other suitable fibers, two ounces to thirty pounds of dry mixture. The calcined gypsum forms the body of the mixture, while the woody matter serves as a filler. The flax-straw acts to bind the materials together and prevent breaking and scaling of the tile or block, while the tannin of the wood, the sulfate of iron, and the iron, silicates, and alkalies of the ashes or cinders coact to impart stone-like properties to the completed tile. The sulfate of iron acts upon the tannin of the wood to change the coloring-matter and change the character of the tannin.

When the tiles are to be exposed to the atmosphere and moisture, as where they are employed for exterior walls, the ashes, woody matter containing tannin, and iron sulfate are employed in increased proportions, as thereby a more solid and stone-like structure results, which prevents the absorption of moisture.

Having described our invention, what we claim as new, and desire to secure by Letters Patent, is—

An improved composition of matter for building or fireproofing purposes consisting of calcined gypsum, fiber, finely-divided woody matter containing tannin, ashes, sulfate of iron and water to form a plastic mass, substantially as described.

In witness whereof we hereunto subscribe our names this 28th day of March, A. D. 1896.

LOUIS WOLTERSDORF.
GEORGE S. ANGUS.

Witnesses:
EDWARD PION,
W. CLYDE JONES.